United States Patent [19]
Sato et al.

[11] Patent Number: 5,596,582
[45] Date of Patent: Jan. 21, 1997

[54] AFC IN OFDM MODULATION BY SHIFT OF A WINDOW ALONG A RECEPTION SAMPLE SEQUENCE

[75] Inventors: Toru Sato; Masafumi Saito, both of Tokyo, Japan

[73] Assignees: NEC Corporation; Nippon Hoso Kyokai, both of Tokyo, Japan

[21] Appl. No.: 450,540

[22] Filed: May 25, 1995

[30] Foreign Application Priority Data

May 26, 1994 [JP] Japan .................................. 6-138386

[51] Int. Cl.[6] .......................................... H04J 3/06
[52] U.S. Cl. ........................ 370/509; 375/366; 375/368; 370/203; 370/513; 370/514
[58] Field of Search ................................ 370/19, 21, 23, 370/69.1, 70, 100.1, 105.1, 105.4, 106; 375/260, 295, 343, 354, 355, 365, 366, 368, 347

[56] References Cited

U.S. PATENT DOCUMENTS

| | | | |
|---|---|---|---|
| 4,291,409 | 9/1981 | Weinberg et al. | 375/347 |
| 4,829,543 | 5/1989 | Borth et al. | 375/343 |
| 5,313,169 | 5/1994 | Fouche et al. | 329/302 |
| 5,406,551 | 4/1995 | Saito et al. | 370/19 |
| 5,444,697 | 8/1995 | Leung et al. | 370/19 |
| 5,471,464 | 11/1995 | Ikeda | 370/19 |

FOREIGN PATENT DOCUMENTS

WO92/05646  4/1992  WIPO.

*Primary Examiner*—Hassan Kizou
*Attorney, Agent, or Firm*—Foley & Lardner

[57] ABSTRACT

In a receiver for an OFDM modulated transmission signal including at least one synchronizing symbol in each frame, the synchronizing symbol is located by stepwise shifting a window along a reception sample sequence to make a cross-correlation calculator (55) calculate cross-correlation values between a stored pattern produced from a pattern memory (53) and sequence portions picked up by the window, a maximum selector (57, 59) select two successive maxima of the cross-correlation values at a time interval substantially equal to a frame period, and a controllable clock generator (61–65) generate a clock sequence at the time interval for use in sampling the sample sequence. On a transmitter side, the at least one synchronizing symbol may either be preceded by a null period or be a main synchronizing symbol preceded by an auxiliary synchronizing symbol for use in roughly defining ranges in which the window should be shifted.

7 Claims, 12 Drawing Sheets

AFC IN OFDM MODULATION BY SHIFT OF A WINDOW ALONG A RECEPTION SAMPLE SEQUENCE

BACKGROUND OF THE INVENTION

This invention relates to transmission of a sequence of data as a transmission signal according to OFDM (orthogonal frequency division multiplex) modulation and reception of the transmission signal as a reproduction of the sequence according to OFDM demodulation and, more particularly, to AFC (automatic frequency control) of a clock sequence for use in the reception and to arrangement of a synchronizing symbol on transmitting the transmission signal. As a consequence, this invention relates to a method of both transmission and reception, to a transmitter device, and to a receiver device.

OFDM digital communication has recently become an object of great concern in digital sound broadcast for mobiles and in digital television broadcast for terrestrial stations. This is because the OFDM digital propagation is hardly adversely affected by multipath fading and ghost.

In the manner which will later be described in greater detail, an OFDM communication system comprises a transmitter device and a receiver device. The transmitter device transmits a transmission signal in response to a sequence of data supplied thereto. The receiver device receives the transmission signal as a received signal and produces a reproduction of the data sequence.

A little more in detail, the transmitter comprises a serial to parallel converter for converting a sequence of data to parallel data. An inverse discrete Fourier transform circuit converts the parallel data to data symbols by OFDM modulation. A composing unit composes the data symbols into successive frames by adding synchronizing symbols to the frames. A digital-to-analog converter converts the successive frames to a baseband transmission signal. Responsive to the baseband transmission signal, a transmitter frequency converter produces either an intermediate or a radio frequency transmission signal. For use in the serial-to-analog converter, a transmitter clock generator generates a transmitter clock sequence of a transmitter clock frequency. For use in the composing unit, the clock generator frequency divides the clock sequence into a transmitter symbol clock sequence and a transmitter frame clock sequence. For use in the inverse Fourier transform circuit, the clock generator further produces a transmitter data clock sequence.

The receiver comprises a receiver frequency converter for receiving the transmission signal as a baseband received signal. An analog-to-digital converter samples reception samples from the received signal to produce a reception sample sequence. A detecting unit detects the synchronizing symbols as synchronization patterns in the reception sample sequence. It will be presumed that the synchronizing symbols are distinct in the reception sample sequence and are correctly detected as the synchronization patterns, respectively. Responsive to the synchronization patterns, a receiver clock generator controllably generates a receiver sampling frequency of a receiver or controllable clock frequency for use in the analog-to-digital converter and a receiver frame clock sequence, a receiver symbol sequence, and a receiver data clock sequence. Responsive to the three latter clock sequences, a reproducing unit subjects the reception sample sequence to OFDM demodulation to produce a reproduction of the data sequence.

In order to correctly receive at the receiver device the transmission signal as the data sequence reproduction, it is indispensable to precisely control the receiver sampling frequency and the receiver frame, symbol, and data frequencies. In the reception sample sequence, frames and symbols may have time positions subjected to fluctuations. In this event, the receiver frequencies must be made to follow the fluctuations. Automatic frequency control of the receiver clock generator is consequently very important.

In Japanese PCT Prepublication (A) No. 504,037 1993, the receiver clock generator is subjected to automatic frequency control by detecting a frequency shift in a receiver sampling clock sequence in response to a phase shift between two pilot carrier signals and by using the frequency shift in controlling the receiver sampling frequency. This Prepublication corresponds to PCT Publication No. WO92/10,043. In Japanese PCT Prepublication (A) No. 501,357 of 1994, the receiver clock generator is automatically frequency controlled by detecting a frequency shift in a receiver sampling clock sequence in response to a phase rotation of received data symbols and by using the frequency shift in controlling the receiver sampling frequency. This latter Prepublication corresponds to PCT Publication No. WO92/05,646.

In the automatic frequency control disclosed in the former publication, it is necessary to use the two pilot carrier signals exclusively in controlling the receiver clock generator. It is therefore unavoidable to superfluously use a processor for dealing with the two pilot carrier signals. In the automatic frequency control revealed in the latter publication, control by the phase rotation alone is insufficient to control the receiver sampling frequency.

SUMMARY OF THE INVENTION

It is consequently an object of the present invention to provide a method of carrying out, in accordance with orthogonal frequency division multiplex, transmission of a transmission signal and reception of the transmission signal with a receiver clock generator automatically frequency controlled without additionally using any pilot carrier signal.

It is another object of this invention to provide a method which is of the type described and in which the receiver clock generator is automatically frequency controlled to a sufficiently correct extent.

It is still another object of this invention to provide a method which is of the type described and in which the receiver clock generator can stably generate a sampling clock sequence insofar as a received signal is sampled to produce reproduction of a synchronizing symbol and of data symbols carried on the transmission signal.

It is yet another object of this invention to provide a method which is of the type described and in which the sampling clock sequence is automatically frequency controlled to stably follow fluctuations in a frame period defined by successive reproductions of such synchronizing symbols and in a symbol period defined by successive reproductions of the data symbols.

It is a further object of this invention to provide a method which is of the type described and in which the receiver clock generator is automatically frequency controlled at a high speed.

It is a still further object of this invention to provide a transmitter device for transmitting a transmission signal for use in the method of the type described.

It is a yet further object of this invention to provide a receiver device for receiving a transmission signal used in a method of the type described.

Other objects of this invention will become clear as the description proceeds. For example, it is possible to provide a method which is of the type described and in which the sampling clock sequence is stably frequency controlled even when an error temporarily appears in the frame period due either to noise superposed on the transmission signal or to an interference introduced to the transmission signal.

In accordance with an aspect of this invention, there is provided a method of transmitting a sequence of data as a transmission signal and of receiving the transmission signal as a reproduction of the sequence of data, the method comprising the steps of: (a) converting the sequence of data to data symbols by orthogonal frequency division multiplex modulation; (b) composing the data symbols into successive frames by adding synchronizing patterns to the frames; (c) transmitting the successive frames as the transmission signal; (d) receiving the transmission signal as a received signal; (e) sampling reception samples from the received signal in response to a clock sequence of a clock frequency to produce a reception sample sequence; (f) detecting synchronization patterns in the reception sample sequence; (g) generating the clock sequence in response to the synchronization patterns; and (h) reproducing the reproduction by orthogonal frequency division multiplex demodulation of the reception sample sequence; wherein: (I) the composing step comprises the steps of: (A) storing a stored symbol comprising a synchronizing symbol to produce a stored pattern sequence comprising synchronizing symbols; and (B) using responsive to the stored symbol sequence of the synchronizing symbol as one of the synchronizing patterns in each frame; (II) the detecting step comprising the steps of: (A) storing a stored pattern comprising a synchronization pattern identical with the synchronizing symbol to produce a stored pattern sequence; (B) calculating responsive to the stored pattern sequence a cross-correlation value between the synchronization pattern and each of candidate patterns derived from the reception sample sequence with a window of a predetermined time duration stepwise shifted relative to the reception sample sequence to produce successive cross-correlation values for the reception sample sequence; (C) selecting from the candidate patterns, as reproductions of the synchronizing symbols, ones of the candidate patterns that give two successive maxima among the cross-correlation values at a time interval substantially coincident in a standstill pattern of the reception sample sequence with a frame period of the frames; and (D) controlling the clock frequency in response to the time interval.

In accordance with a different aspect of this invention, there is provided a transmitter device responsive to a sequence of data for producing a transmission signal, the transmitter device comprising: (a) converting means for converting the sequence of data to data symbols by orthogonal frequency division multiplex modulation; (b) composing means for composing the data symbols into successive frames by adding synchronizing patterns to the frames; and (c) transmitting means for transmitting the successive frames as the transmission signal; wherein the composing means comprises: (A) storing means for storing a stored symbol comprising a synchronizing symbol to produce a stored symbol sequence; and (B) using means responsive to the stored symbol sequence for using the synchronizing symbols as one of the synchronizing patterns in each frame.

In accordance with a further different aspect of this invention, there is provided a receiver device for receiving a transmission signal derived from successive frames, each of which is composed of at least one synchronizing symbol and a sequence of data symbols with the data symbols produced by subjecting a sequence of data to orthogonal frequency division multiplex modulation, the receiver device comprising: (a) receiving means for receiving the transmission signal as a received signal; (e) sampling means responsive to a clock sequence of a clock frequency for sampling reception samples from the received signal to produce a reception sample sequence; (c) detecting means for detecting synchronization patterns in the reception sample sequence; (d) clock generating means responsive to the synchronization patterns for generating the clock sequence; and (e) reproducing means for reproducing, by orthogonal frequency division multiplex demodulation of the reception sample sequence, a reproduction of the sequence of data; wherein the detecting means comprises: (A) storing means for storing a stored pattern comprising a synchronization pattern identical with the synchronizing symbol to produce a stored pattern sequence comprising synchronization patterns; (B) calculating means responsive to the stored pattern sequence for calculating a cross-correlation value between the synchronization pattern and each of candidate patterns derived from the reception sample sequence with a window of a predetermined time duration stepwise shifted relative to the reception sample sequence to produce successive cross-correlation values for the reception sample sequence; (C) selecting means for selecting from the candidate patterns, as reproductions of the synchronizing symbols, ones of the candidate patterns that give two successive maxima among the cross-correlation values at a time interval substantially coincident in a standstill pattern of the reception sample sequence with a frame period of the frames; and (D) control means for controlling the clock frequency in response to the time interval.

DESCRIPTION OF THE PREFERRED EMBODIMENTS

Figure 1:
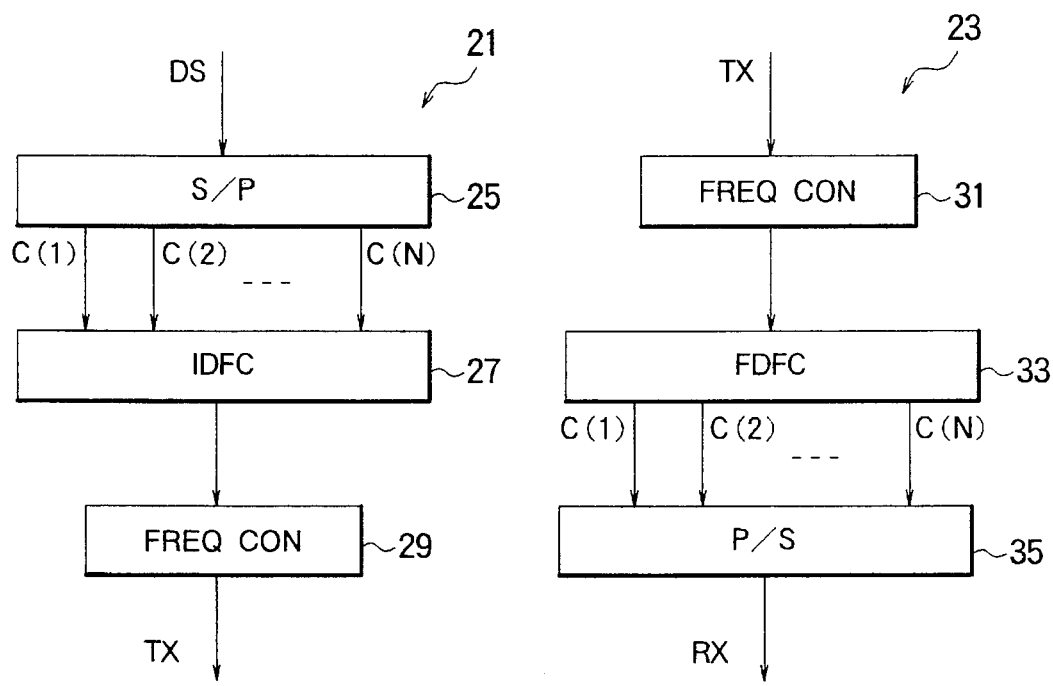
FIG. 1 is a block diagram of an OFDM (orthogonal frequency division multiplex) communication system in general.

Referring to FIGS. 1 through 5, an OFDM (orthogonal frequency division multiplex) digital communication system will first be described in general. In FIG. 1, the OFDM communication system comprises a transmitter device 21 and a receiver device 23.

The transmitter device 21 comprises a serial to parallel converter (S/P) 25 for converting a sequence of data DS supplied thereto to first through N-th parallel data C(1), C(2), ..., and C(N), where N represents a predetermined integer which may be selected from several tens to several thousands. Each datum of the sequence is given by a complex number for one of carrier signals which will presently be described.

An inverse discrete Fourier transform circuit or converter (IDFC) 27 inverse discrete Fourier converts the parallel data onto a time axis to produce data sample values sampled by a transmission sampling clock sequence or signal of a transmission sampling frequency. The inverse discrete Fourier converter 27 furthermore forms the data sample values into a baseband analog signal.

Figure 2:
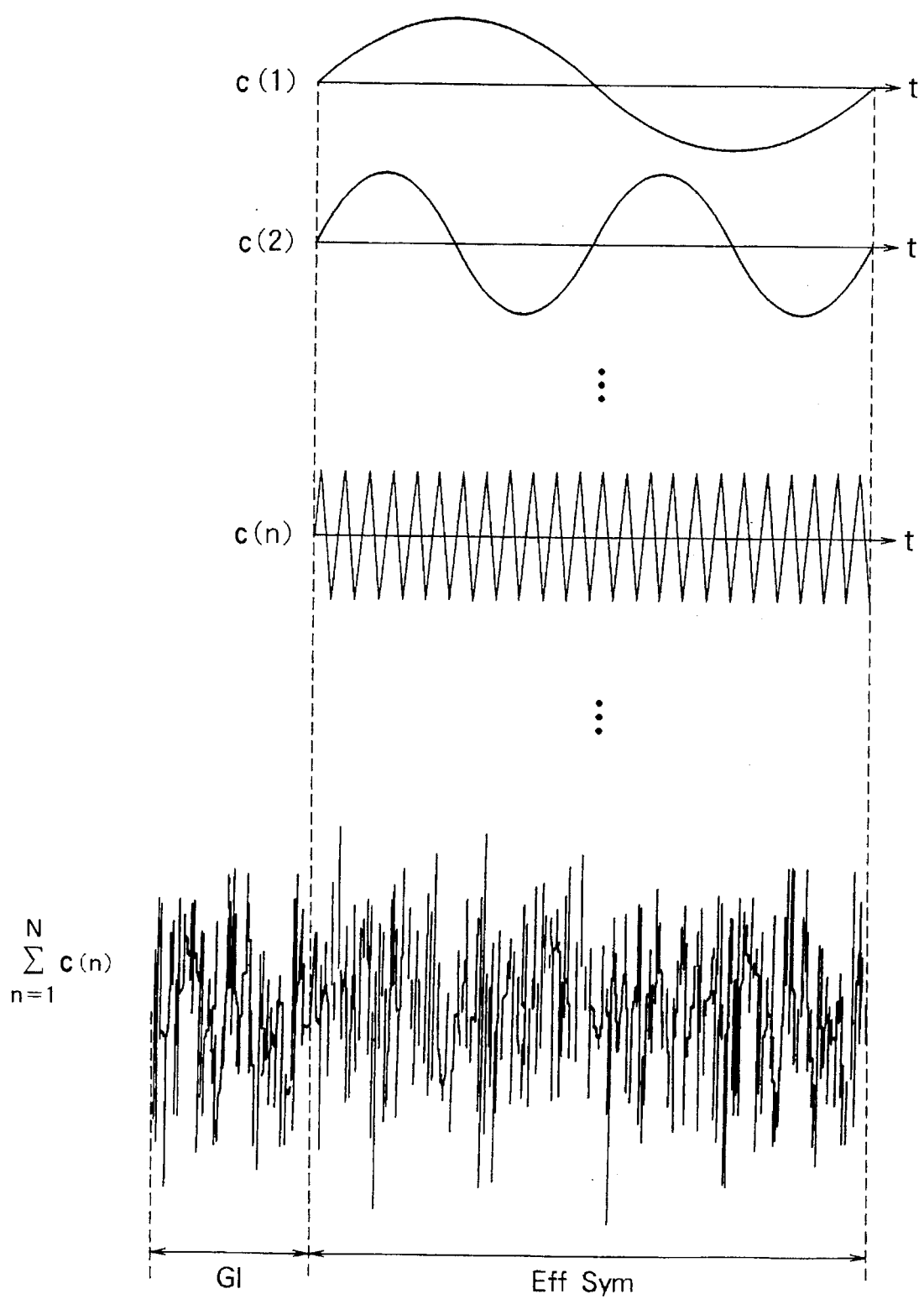
FIG. 2 shows carrier signals and a composite signal for use in OFDM communication.

Turning to FIG. 2 during a short while, first through N-th carrier signals $c(1), c(2), \ldots, c(n), \ldots$ have different carrier frequencies as depicted with time t commonly scaled along abscissae and with an amplitude A scaled along each ordinate. A superposed carrier signal of the first through the N-th carrier signals has a waveform exemplified at the bottom.

According to OFDM modulation, these carrier signals are digitally modulated into OFDM modulated signals, which are summed up into a composite OFDM modulated signal. Four-phase quadrature phase shift keying (QPSK) is most frequently used for digital modulation. Alternatively, quadrature amplitude modulation (QAM) is used.

The composite modulated signal is transmitted as data symbols. Each data symbol lasts during a data symbol interval consisting of an effective symbol interval Eff sym and a guard interval GI. Such effective symbol intervals are used in actually transmitting the parallel data of the type described in conjunction with FIG. 1. The guard interval is a redundant interval for reducing adverse effects caused by multipath. In such guard intervals, the waveform of the effective symbol intervals is cyclically used.

Figure 3:
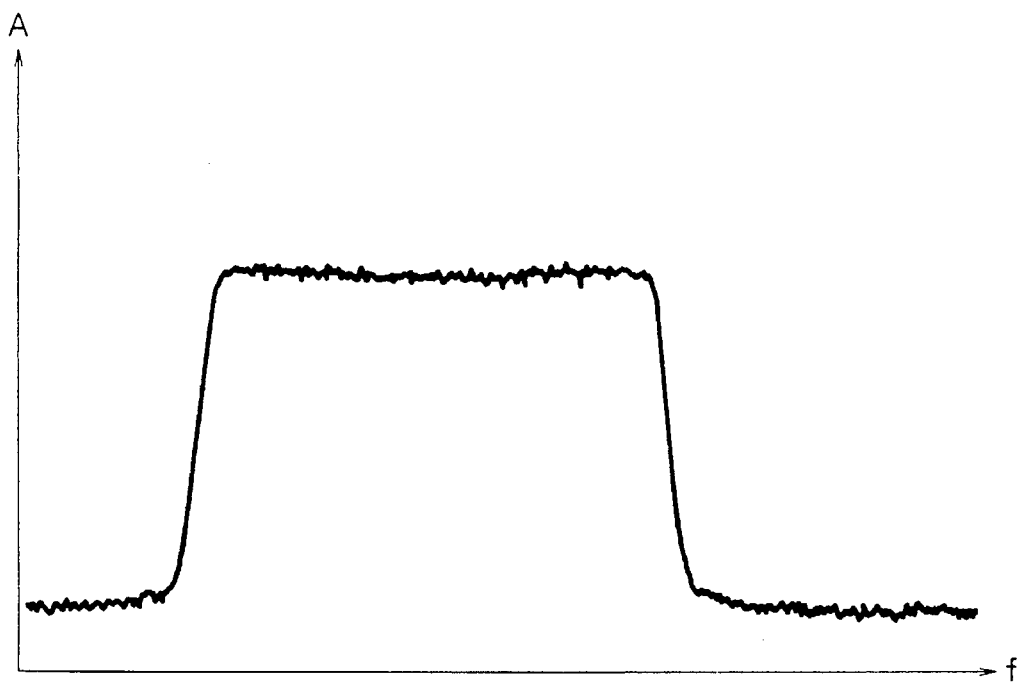
FIG. 3 exemplifies an OFDM modulated signal.

Further turning to FIG. 3, it will be assumed in FIG. 2 that a frequency difference between two adjacent carrier signals is equal to an inverse number of the effective symbol interval. In this event, a frequency spectrum of each digitally modulated signal has zero points coincident with the carrier frequencies of other modulated signals and is subjected to no interference with the carrier signals. As a result, the OFDM modulated signal has an approximately rectangular power spectrum illustrated with a frequency f scaled along the abscissa and with the amplitude A scaled along the ordinate.

Figure 4:
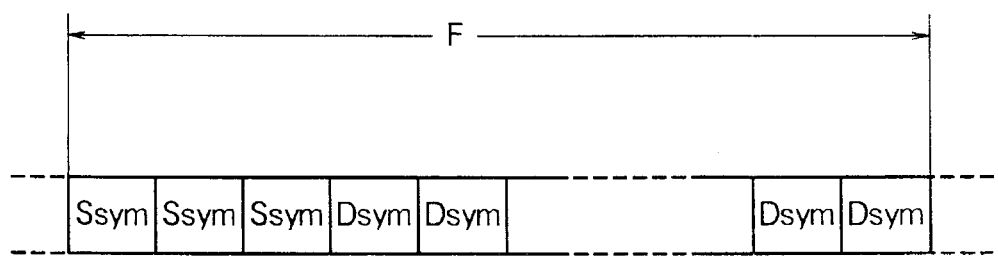
FIG. 4 exemplifies a frame of an OFDM transmission signal.

Turning back to FIG. 1 and referring afresh to FIG. 4, a plurality of the data symbols are grouped into each of successive frames of a common frame period F by adding a few frame synchronizing symbols Ssym to each frame. As indicated by a label Dsym, data symbols of a predetermined integer are included in each frame following the frame synchronizing symbols. If necessary, each frame additionally includes at least one service identification symbol. In FIG. 1, a transmitter frequency converter (FREQ CON) 29 frequency converts the baseband analog signal into a transmission signal TX.

Figure 5:
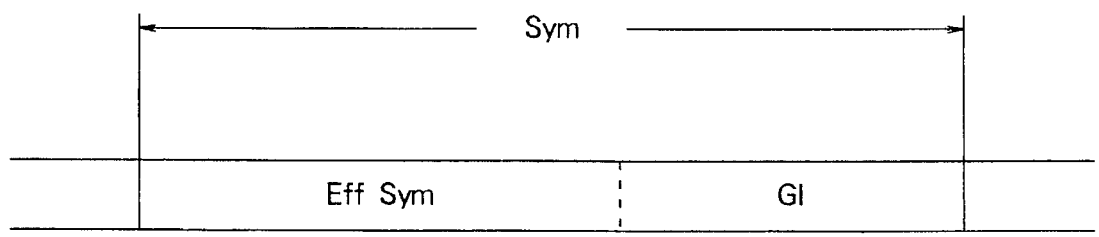
FIG. 5 shows an OFDM modulated data signal.
Figure 5:

Turning to FIG. 5 with FIG. 1 continuously referred to, the inverse discrete Fourier converter 27 produces the data sample values which are equal in number to $2^k$ in each effective symbol interval Eff as scaled along a bottom row by 0, 1, 2, ..., and $2^k$, where k represents a positive integer. Each data symbol therefore consists of $2^k(1+r(G))$ sample values, where r(G) represents a ratio of the guard interval to the effective symbol interval.

In FIG. 1, the receiver device 23 comprises a receiver frequency converter (FREQ CON) 31 for frequency converting the transmission signal propagated thereto to a baseband received signal. Sampled from the received signal by a receiver sampling clock sequence or signal of a receiver sampling frequency which is substantially identical with the transmitter sampling frequency, reception samples of a reception sample sequence are delivered to a forward discrete Fourier transform circuit or converter (FDFC) 33, Forward discrete Fourier converting the reception sample sequence onto a frequency domain and calculating phases and amplitudes of frequency components of the respective carrier frequencies, the forward discrete converter 33 produces reproductions of the first through the N-th parallel data which are designated by using the reference symbols C(1), C(2), ..., and C(N). A parallel to serial converter (P/S) 35 converts the reproductions to the sequence of data used in the transmitter device. In this manner, the receiver device 23 produces a data sequence reproduction RX.

Reviewing FIGS. 1 through 5, a controllable clock generator (not herein shown) is used to produce the receiver sampling clock sequence with a controllable sampling frequency. Based on the receiver sampling clock sequence, a receiver baseband clock sequence is produced. Furthermore, receiver frame, symbol, and data clock sequences are used together with the receiver sampling clock sequence in the forward discrete Fourier converter 33 and are derived from the receiver sampling clock sequence.

Automatic frequency control (AFC) is necessary for the baseband clock sequence of the receiver device 23 to make its clock frequency follow a possible variation in the clock frequency of the received signal which reaches the receiver device 23. The sampling, the frame, the symbol, and the data clock sequences must also be subjected to automatic frequency control to insure correct operation of the forward discrete Fourier converter 33. The samples must be sampled from the received signal exactly $2^k(1+r(G))$ times per symbol.

Figure 6:
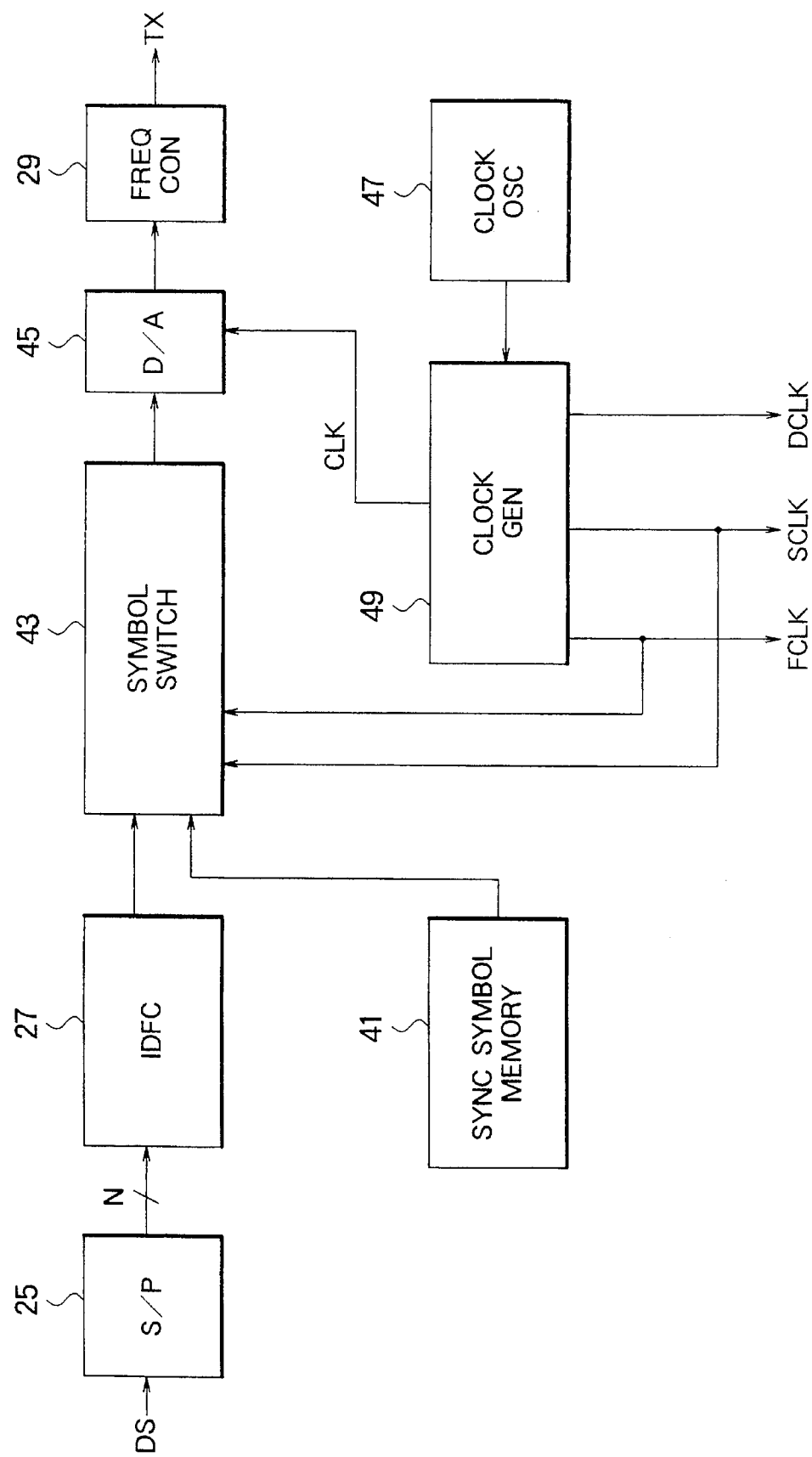
FIG. 6 is a block diagram of a transmitter device in an OFDM communication system which is illustrated in FIG. 1 in general and is according to a first embodiment of the instant invention.

Referring now to FIG. 6, a transmitter device is for use in an OFDM digital communication system according to a first embodiment of the present invention. This transmitter device corresponds to the transmitter device 21 described in conjunction with FIG. 1 and comprises a serial to parallel converter, an inverse discrete Fourier converter, and a transmitter frequency converter which are labelled like in FIG. 1 and are designated by the reference numerals 25, 27, and 29.

In FIG. 6, the transmitter device comprises a synchronizing symbol memory 41 which is preliminarily stored with a frame synchronizing symbol to produce a sequence or succession of synchronizing symbols. A symbol switch 43 is connected to the inverse discrete Fourier converter 27 and to the synchronizing symbol memory 41. A digital to analog converter (D/A) 45 is interposed between the symbol switch 43 and the frequency converter 29. A transmitter clock oscillator 47 generates a transmitter clock oscillation. Connected to the clock oscillator 47, a transmitter clock generator 49 produces a transmitter sampling clock sequence CLK, a transmitter frame clock sequence FCLK, a transmitter symbol clock sequence SCLK, and a transmitter data clock sequence DCLK. The sampling clock sequence is delivered to the digital to analog converter 45. The frame and the symbol clock sequences are delivered to the symbol switch 43. In the manner described in the foregoing, the serial to parallel converter 25 and the inverse discrete Fourier converter 27 are supplied from the clock generator 49 with various clock sequences.

In FIG. 1, the data sequence DS is a sequence of binary bits such as "1" and/or "0" data. The serial to parallel converter 25 segments the sequence of data into blocks, each consisting of a preselected number of bits. The preselected number is typically decided between two and eight. The bits of the preselected number are represented by a complex number. The serial to parallel converter 25 supplies the inverse discrete Fourier converter 27 with such complex numbers, N in total, at a time as a parallel datum for modulating a certain one of the carrier signals described in connection with FIG. 2.

The inverse discrete Fourier converter 27 converts such parallel data into the data sample values on the time axis. This inverse discrete Fourier conversion is carried out once in each symbol interval defined by the symbol clock sequence. Each data sample is a quantized digital datum of, for example, eight quantization bits at one of sampling instants indicated in FIG. 5 by short upright lines along the bottom row. Incidentally, the number of quantization bits should be decided in compliance with the manner of modulation, such as the four-phase quadrature phase shift keying.

The frame clock sequence defines a frame period of successive frames for use in the transmission signal TX produced by the transmitter device. Responsive to the frame and the symbol clock sequences, the symbol switch 43 picks up one of the synchronizing symbols from the sequence of synchronizing symbols and places this one of the synchronizing symbols in a first symbol interval in each frame period. For a second and later symbol intervals of the frame period under consideration, the symbol switch 43 places data symbols from a sequence of data sample values produced by the inverse discrete Fourier converter 27. Depending on the circumstances, the symbol switch 43 consecutively picks up two synchronizing symbols to place these synchronizing symbols in the first and the second symbol intervals.

In this manner, the symbol switch 43 composes the data frames of the type illustrated with reference to FIG. 4. It is convenient to say that the symbol switch 43 adds synchronizing patterns to the frames and uses at least one of the synchronizing patterns as one of the synchronizing patterns in each frame.

The transmitter sampling clock sequence has a transmitter sampling frequency. The transmitter frame clock sequence has a transmitter frame frequency which defines the frame period and is equal to a first inverse integral multiple of the sampling frequency. The transmitter symbol clock sequence has a transmitter symbol frequency which defines the symbol interval and is equal to a second integral multiple of the frame frequency.

The clock generator 49 consequently frequency divides the clock oscillation into the sampling and other clock sequences. If desired, the clock generator 49 may include a local oscillator for generating, for example, the symbol clock sequence. The local oscillator must, however, be phase-locked to the clock oscillator 47.

The symbol switch 43 produces a sequence of frames as the baseband transmission signal of the type which is described before. Each frame consists of digital sample values. The digital to analog converter 45 converts the baseband transmission signal to the analog baseband signal. The frequency converter 29 frequency converts the analog baseband signal to an RF or an IF transmission signal TX.

Figure 7:
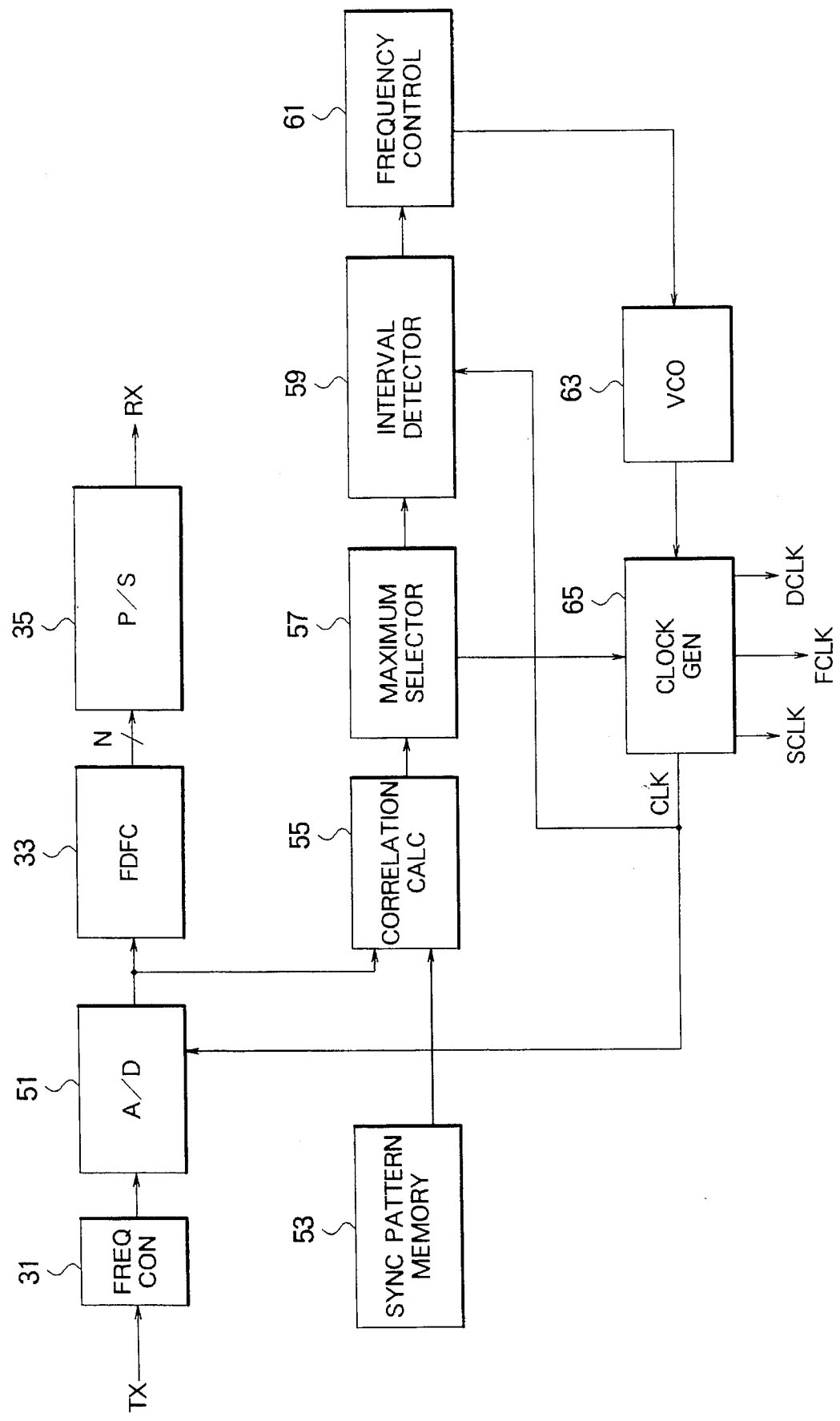
FIG. 7 is a block diagram of a receiver device in the OFDM communication system mentioned in connection with FIG. 6.

Turning to FIG. 7 with FIG. 6 continuously referred to, a receiver device is a counterpart device of the transmitter device. The receiver device therefore corresponds to the receiver device 23 of FIG. 1 and comprises a receiver frequency converter, a forward discrete Fourier transform circuit or converter, and a parallel to serial converter which are designated by the reference numerals 31, 33, and 35.

In FIG. 7, an analog to digital converter (A/D) 51 is separately illustrated between the frequency converter 31 and the discrete Fourier converter 33. A synchronization pattern memory 53 is preliminarily stored with a stored pattern to produce a stored pattern sequence or succession. The stored pattern is identical with the synchronizing symbol in the manner which will shortly be described. A cross-correlation calculator 55 is connected to the analog to serial converter 51 and to the synchronization memory 53. The cross-correlation calculator 55 calculates a cross-correlation value Xcor which will presently be described and is briefly called a correlation value. Accordingly, the cross-correlation calculator 55 will hereinafter be referred to in short as a correlation calculator 55.

A maximum selector 57 is connected to the correlation calculator 55. An interval detector 59 is connected to the maximum selector 57. A frequency controller 61 is connected to the interval selector 59. A controllable oscillator, such as a voltage controlled oscillator (VCO), 63 is controlled by the frequency controller 61. A receiver clock generator 65 is connected to the controllable oscillator 63 and produces various receiver clock sequences, such as a receiver sampling clock sequence, a receiver frame clock sequence, a receiver symbol clock sequence, and a receiver data clock sequence which are designated by the reference symbols used for the transmitter clock generator 49 and have a receiver sampling frequency, a receiver frame frequency, a receiver symbol frequency, and a receiver data frequency.

Figure 8:
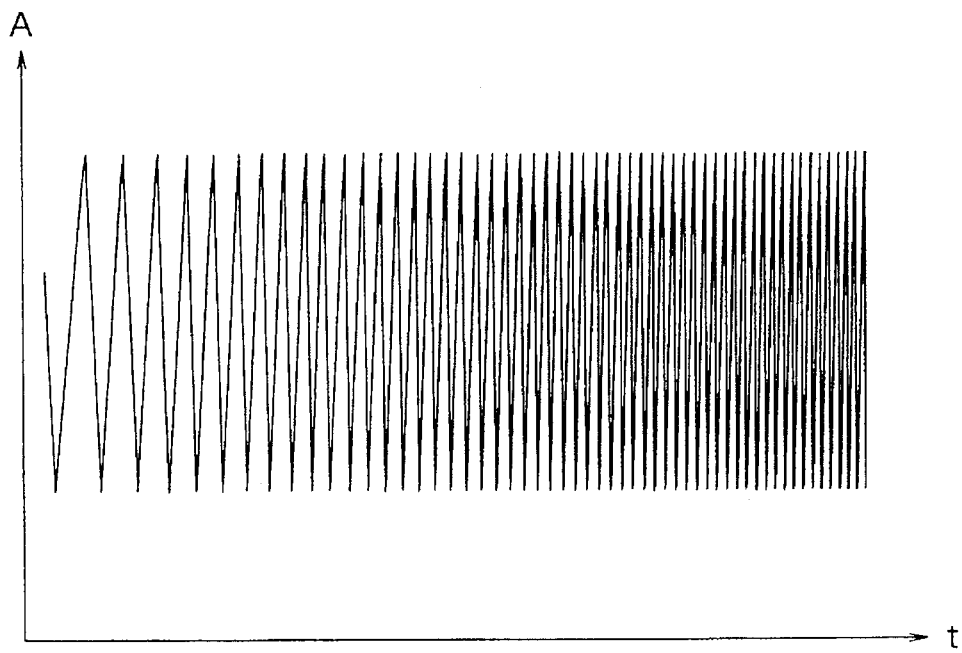
FIG. 8 exemplifies a sweep signal.
Figure 9:
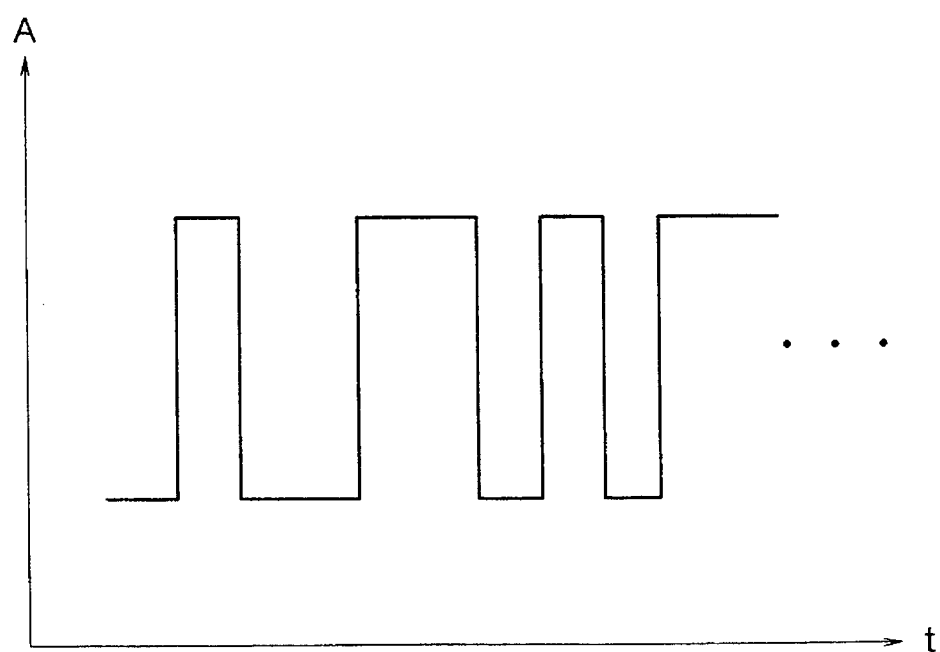
FIG. 9 exemplifies a pseudonoise signal.

Turning temporarily to FIGS. 8 and 9, time t is indicated along each abscissa with an amplitude A indicated along each ordinate. A sweep signal has a frequency which is monotonously swept from a low frequency to a high frequency. A pseudonoise or PN signal has an amplitude which randomly varies between a high and a low level.

Turning back to FIG. 7, the transmission signal TX is supplied to the frequency converter 31 and is converted to a baseband received signal. Responsive to the sampling clock sequence supplied from the clock generator 65, the analog to digital converter 51 samples the received signal and produces a reception sample sequence RS. Each reception sample has a sample value represented by, for example, eight bits at each sampling instant. Such sample values are successively produced as a sample value time sequence.

Supplied with the sample value sequence, the forward discrete Fourier converter 33 converts the sample values into complex data representative of complex values in the frequency domain in each symbol interval. The discrete Fourier converter 33 thereby produces N parallel sequences of complex data. Directing attention to an absolute value and a phase angle of each complex datum, the parallel to serial converter 35 estimates, as estimated data, the binary data which are converted by the inverse discrete Fourier converter 27 into the transmission signal carried on the OFDM modulation carrier signals. A sequence of the estimated data is the data sequence reproduction RX.

Figure 10:
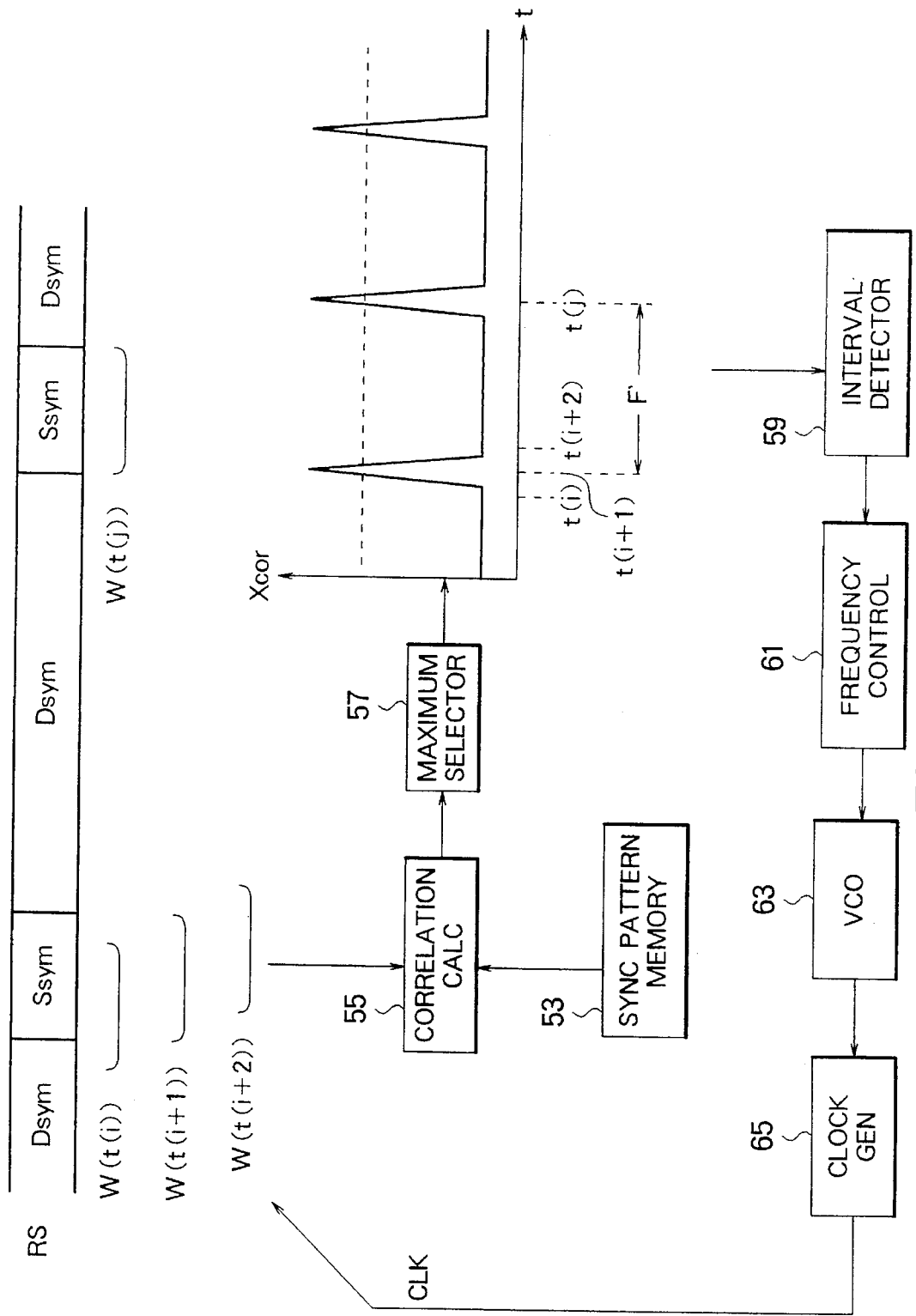
FIG. 10 shows a partial block diagram of the receiver device depicted in FIG. 7 together with signals at a few points in the receiver device.

Referring to FIG. 10 with FIGS. 6 and 7 additionally referred to, the synchronization pattern memory 53 stores the stored pattern as a digital datum of eight-bit values at each sample point. It is presumed that the synchronizing symbol is known on preliminary storing the stored pattern. It is preferred that the synchronizing symbol and consequently the stored pattern produces a sharp autocorrelation peak with a precision of the order of one to ten clocks. Examples of such a symbol or pattern is either the sweep signal or the PN signal illustrated with reference to FIGS. 8 and 9.

The correlation calculator 55 is supplied from the analog to digital converter 51 with the reception sample sequence RS and from the synchronization pattern memory 53 with the stored pattern sequence. In the reception sample sequence, some and others of the reception samples would be the synchronizing symbol Ssym and the data and other symbols Dsym. The correlation calculator 55 calculates the cross-correlation value Xcor between the stored pattern and each of the reception samples. It is, however, not yet certain where each synchronizing symbol is included in the reception sample sequence.

The correlation calculator 55 therefore calculates the correlation value with a window of a symbol length stepwise shifted along the reception sample sequence. The window may be shifted by one to several samples. As a result of the shift, the window is moved relative to the reception sample sequence as indicated at $W(t(i))$, $W(t(i+1))$, $W(t(i+2))$, ..., $W(t(j))$, .... Picked up by the window, positions of the reception sample sequence are herein called candidate patterns. As a consequence, the correlation calculator 55 produces successive cross-correlation or correlation values.

The maximum selector 57 compares the successive correlation values with a threshold level. As depicted with time t along the abscissa and with the correlation value Xcor along the ordinate, the correlation value has peaks above the threshold level indicated by a horizontal dotted line at time points $t(i+1)$, $t(j)$, .... Successively detecting maxima of the correlation values, the maximum selector 57 selects ones of the candidate patterns that give two successive maxima.

The interval detector 59 measures a time interval F' between such two maxima. It is duly possible to understand that the frame period is known at the receiver device. When the time interval of maxima is substantially coincident with the frame period, the above-mentioned ones of the candidate patterns are synchronization patterns which are reproductions of the synchronizing symbols. The synchronization patterns are used to make the frequency converter 61 control the controllable oscillator 63 and eventually the sampling, the frame, the symbol, the data, and the like frequencies of the clock generator 65.

In practice, the interval detector 59 measures the time interval of maxima in terms of sampling clocks as a detected count of the sampling clocks. The frame period is known as a reference count of the sampling clocks. The interval detector 59 compares the measured count with the reference count. If the controllable oscillator 63 is the voltage controlled oscillator, the frequency controller 61 supplies the voltage controlled oscillator 63 with a D.C. voltage which raises and reduces the oscillation frequency when the measured count is less and greater than the reference count. Incidentally, the receiver clock generator 65 may separately include a phase-locked oscillator like the transmitter clock generator 49.

Figure 11:
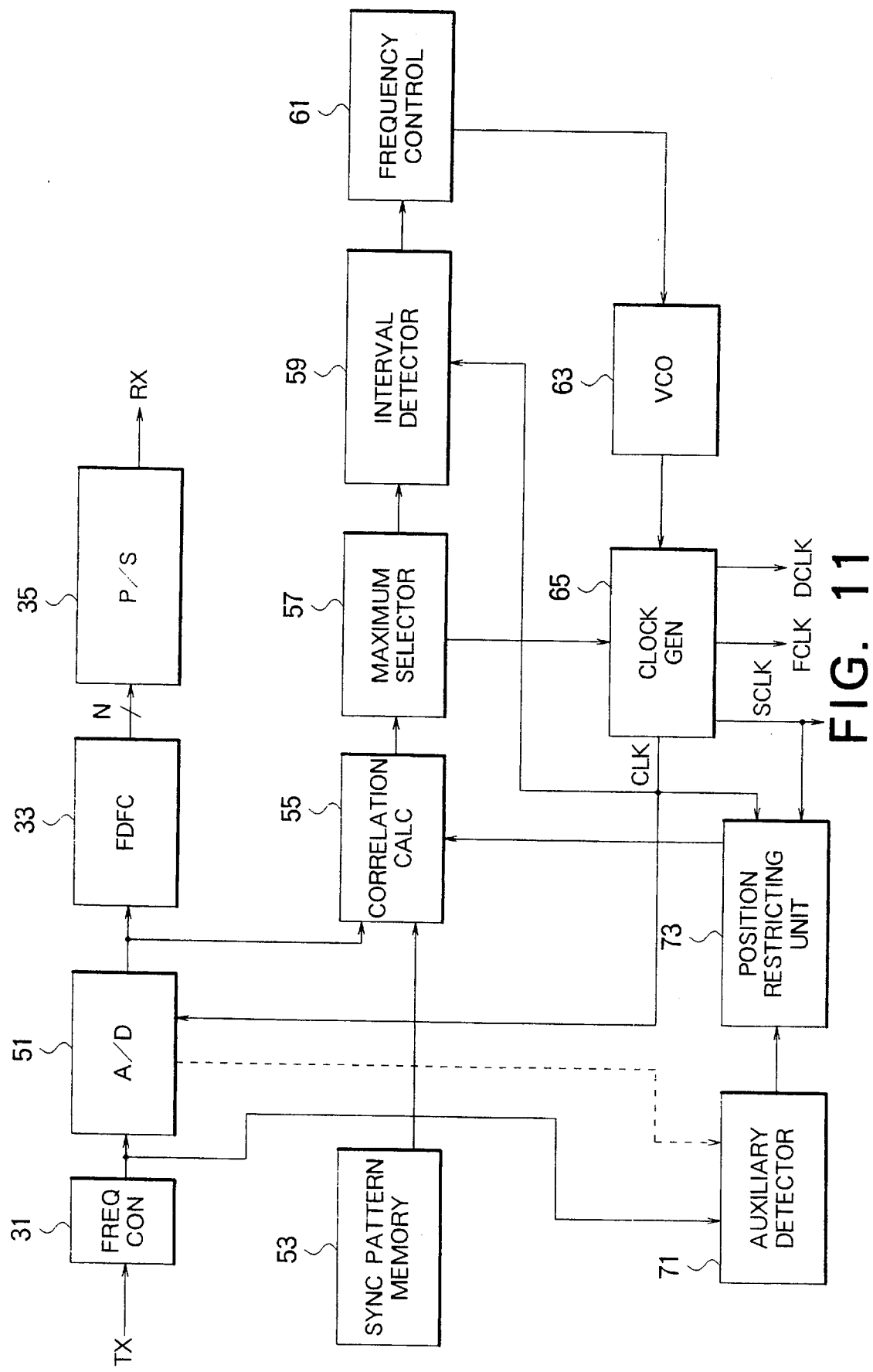
FIG. 11 is a block diagram of a receiver device of an OFDM communication system according to a second embodiment of this invention.

Referring to FIG. 11, a receiver device is for use in an OFDM digital communication system according to a second embodiment of this invention. Similar parts are designated by like reference numerals.

Using as a counterpart device the receiver device being illustrated, a transmitter device is similar in structure to that described with reference to FIGS. 1 through 6 and 8 and 9. The synchronizing symbol memory 41 is, however, preliminarily stored with the stored symbol in which the synchronizing symbol follows as a main synchronizing symbol Msync an auxiliary synchronizing symbol Async preceding the main synchronizing symbol. The synchronizing symbol memory 41 produces the stored symbol sequence which repeatedly indicates the auxiliary and the main synchronizing symbols as the sequence of synchronizing symbols. The symbol switch 43 places the auxiliary and the main synchronizing symbols in the first and the second symbol intervals in each frame and the data symbols in other symbol intervals of the frame. In other respects, the transmitter device is not different in operation.

Figure 12:
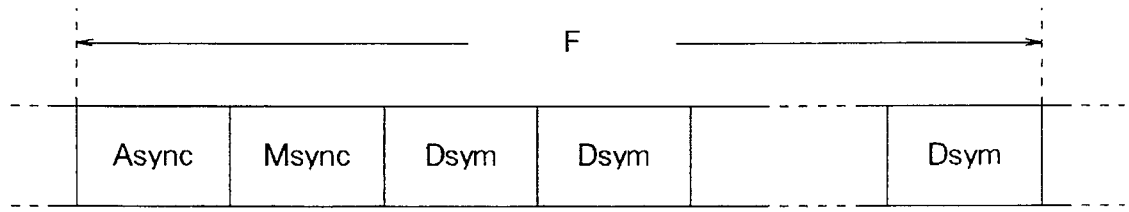
FIG. 12 shows a frame used in the receiver device illustrated in FIG. 11.

Turning temporarily to FIG. 12, one frame of the successive frames is illustrated like in FIG. 4. The auxiliary and the main synchronizing symbols are indicated by Async and Msync. The main synchronizing symbol is used to finely or minutely indicate a particular time instant on the time axis as above in one to ten samples. The auxiliary synchronizing symbol is used to coarsely or roughly indicate the particular time instant in ten to several hundred samples and has a waveform which can sufficiently rapidly be detected as compared with that of the main synchronizing symbol. Such a signal may be a null signal of giving no signal during one symbol interval. Alternatively, the signal may be a single carrier signal in which a sinusoidal signal of a sole frequency lasts during one symbol interval. As a further alternative, the signal may be a multi-carrier signal into which sinusoidal signals of several frequencies are summed up.

Turning back to FIG. 11, the frequency converter 31 produces a substantially direct-current component while the auxiliary synchronizing symbol lasts in the baseband received signal. Besides delivered to the analog to digital converter 51, the baseband received signal is supplied to an auxiliary synchronizing symbol detector which will be referred to briefly as an auxiliary detector 71. Frequency selecting the direct-current component from the received signal, the auxiliary detector 71 produces an auxiliary position signal indicative of a position of the auxiliary synchronizing symbol in the received signal. It is possible to make the analog to digital converter 51 produce the auxiliary position signal indicative of the position not as an analog signal as described but as a digital signal. In this latter event, this digital auxiliary position signal is delivered to the auxiliary detector 71 in the manner depicted by a dashed line not from the frequency converter but from the analog to digital converter 51.

Responsive to the auxiliary position signal which may be either the analog or the digital signal, a window position restricting unit 73 roughly estimates position estimations where the main synchronizing symbol would successively appear in the received signal. On estimating the position estimations, the position restricting unit 73 uses the receiver sampling and symbol clock sequences and produces a gate signal which is switched to an on state during each interval in which each main synchronizing symbol appears in the received signal with a high probability.

In the synchronization pattern memory 53, the stored pattern consists of the synchronization pattern which is now identical with the main synchronizing symbol. Like in FIGS. 7 and 10 and supplied with the gate signal, the correlation calculator 55 calculates the correlation values with the window stepwise shifted only while the gate signal is kept in the on state. In other respects, the receiver device of FIG. 11 is operable like the receiver device illustrated with reference to FIGS. 8 through 10.

The position restricting unit 73 may turn the gate signal to the on state in response to the auxiliary position signal which is only once supplied thereto. In this event, the position restricting unit should thereafter switch the gate signal repeatedly to the on state at the frame period by counting clocks of either the sampling or the symbol clock sequence. It is now appreciated that a remarkable reduction is possible in an amount of calculation of the correlation values.

Figure 13:
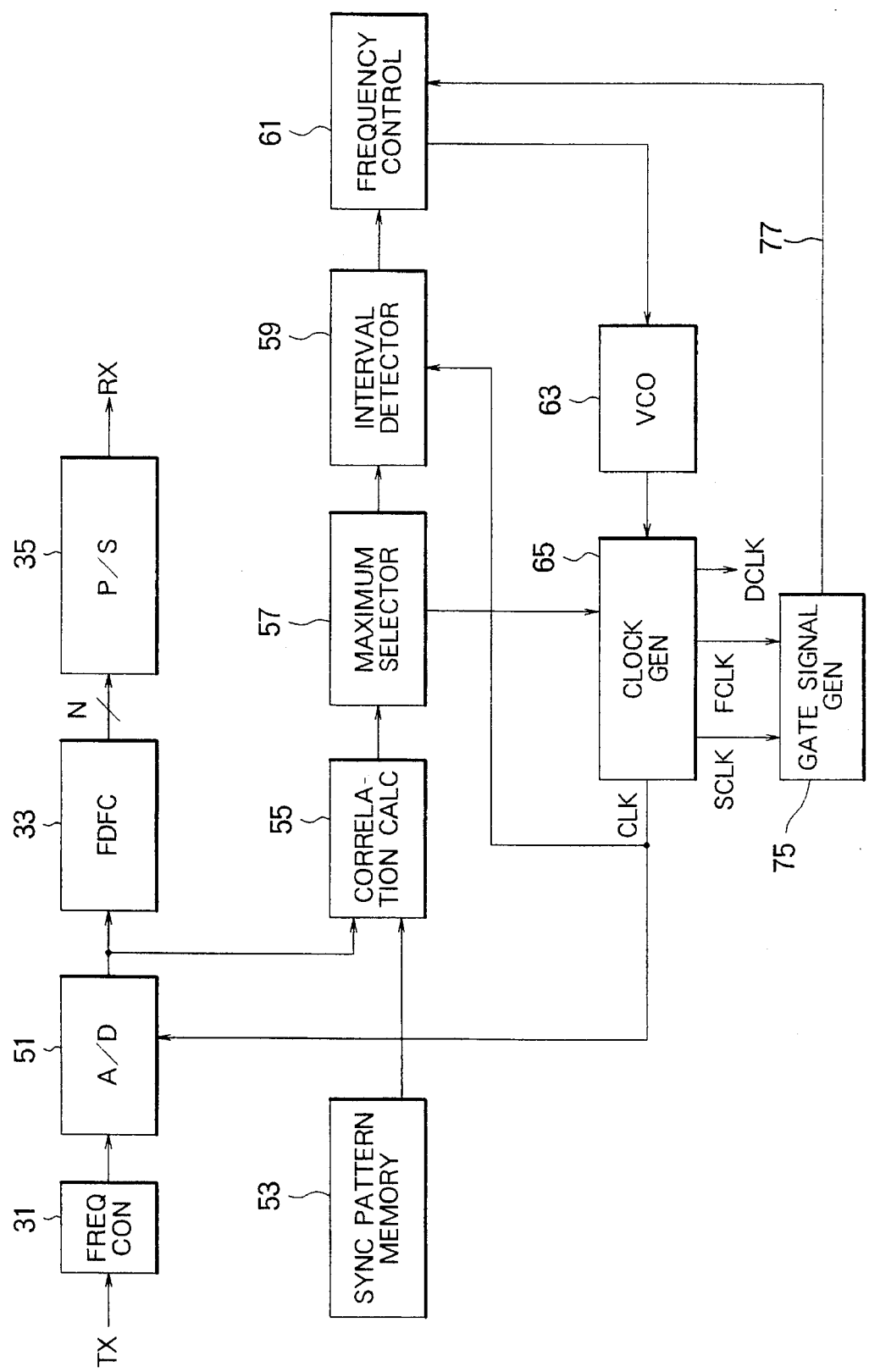
FIG. 13 is a block diagram of a receiver device in an OFDM communication system according to a third embodiment of this invention.

Referring to FIG. 13, the description will proceed to a receiver device for use in an OFDM digital communication system according to a third embodiment of this invention. Similar parts are designated by like reference numerals.

Using as a counterpart device the receiver device being illustrated, a transmitter device is similar to that described with reference to FIGS. 1 through 6 and 8 and 9. The synchronizing symbol memory 41 is, however, preliminary stored with the stored symbol in which the synchronizing symbol is preceded by a null symbol NULL representative of no signal during one symbol interval. The synchronizing symbol memory 41 produces the stored symbol sequence which repeatedly indicates the null and the synchronizing symbols as the sequence of synchronization patterns.

Figure 14:
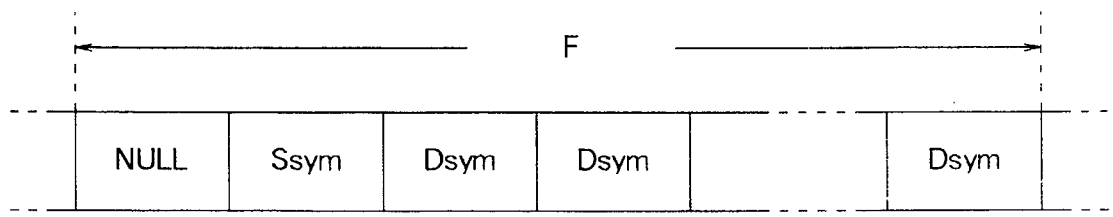
FIG. 14 shows a frame used in the receiver device depicted in FIG. 13.

Turning temporarily to FIG. 14, one frame of the successive frames is depicted as in FIG. 4 or 12. The null and the synchronizing symbols are indicated by NULL and Ssym. The null symbol is similar to the null signal described in connection with FIG. 12.

Turning back to FIG. 13, the receiver device comprises a gate signal generator 75 connected to the clock generator 65. The gate signal generator 75 is connected to the frequency controller 61 through a gate signal line 77.

Supplied with the receiver frame and symbol clock sequences from the clock generator 65, the gate signal generator 75 produces a gate signal turned to an on state in each frame period while the symbol clock sequence indicates a null period which the first symbol interval alone comprises. Through the gate signal line 77, the gate signal is delivered to the frequency controller 61. In other words, the null period lasts one symbol interval at most. In this connection, it should be noted that the controllable oscillator 63 is frequency controlled within a control interval which is shorter than one symbol interval.

Responsive to the gate signal, the frequency controller 61 controls the controllable oscillator 63 only while the gate signal is kept in the on state, namely, while the receiver frame and symbol clock sequences indicate the first symbol interval or shorter in each frame period. During a different period in each frame, the frequency controller 61 suspends control of the controllable oscillator 63. It is now understood that the controllable oscillator 63 is not controlled while the synchronizing symbol and the data symbols are sampled by the analog to digital converter 51 from the received signal and that the receiver clock generator 65 stably generates meanwhile the receiver clock sequence.

Figure 15:
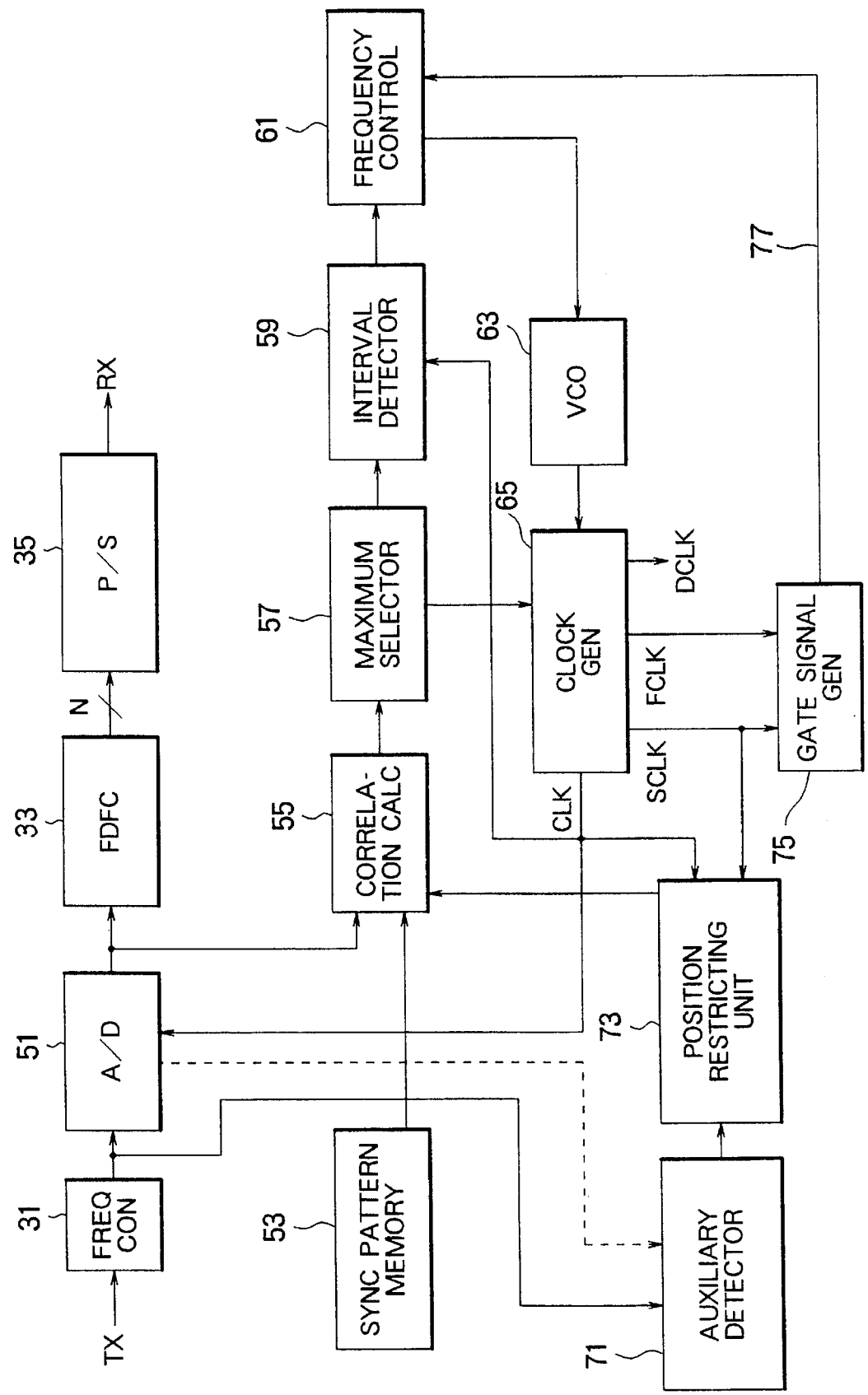
FIG. 15 is a block diagram of a receiver device in an OFDM communication system according to a fourth embodiment of this invention.

Referring to FIG. 15, attention will be directed to a receiver device for use in an OFDM digital communication system according to a fourth embodiment of this invention. Similar parts are designated by like reference numerals. Using as a counterpart device the receiver device being illustrated, a transmitter device is not different from that described in conjunction with the receiver device illustrated with reference to FIG. 13. The synchronizing symbol sequence is as depicted in FIG. 12.

In FIG. 15, the receiver device comprises the auxiliary device 71, the position restricting unit 73, the gate signal generator 75, and the gate signal line 77. The gate signal generator 75 gives the on state to the gate signal during the first symbol interval in each frame at the longest. The correlation calculator 55 and the frequency controller 61 are operable in the manner described in connection with FIGS. 11 and 13, respectively. This receiver is therefore excellently operable as described in conjunction with FIG. 11 and additionally as described in connection with FIG. 13.

Figure 16:
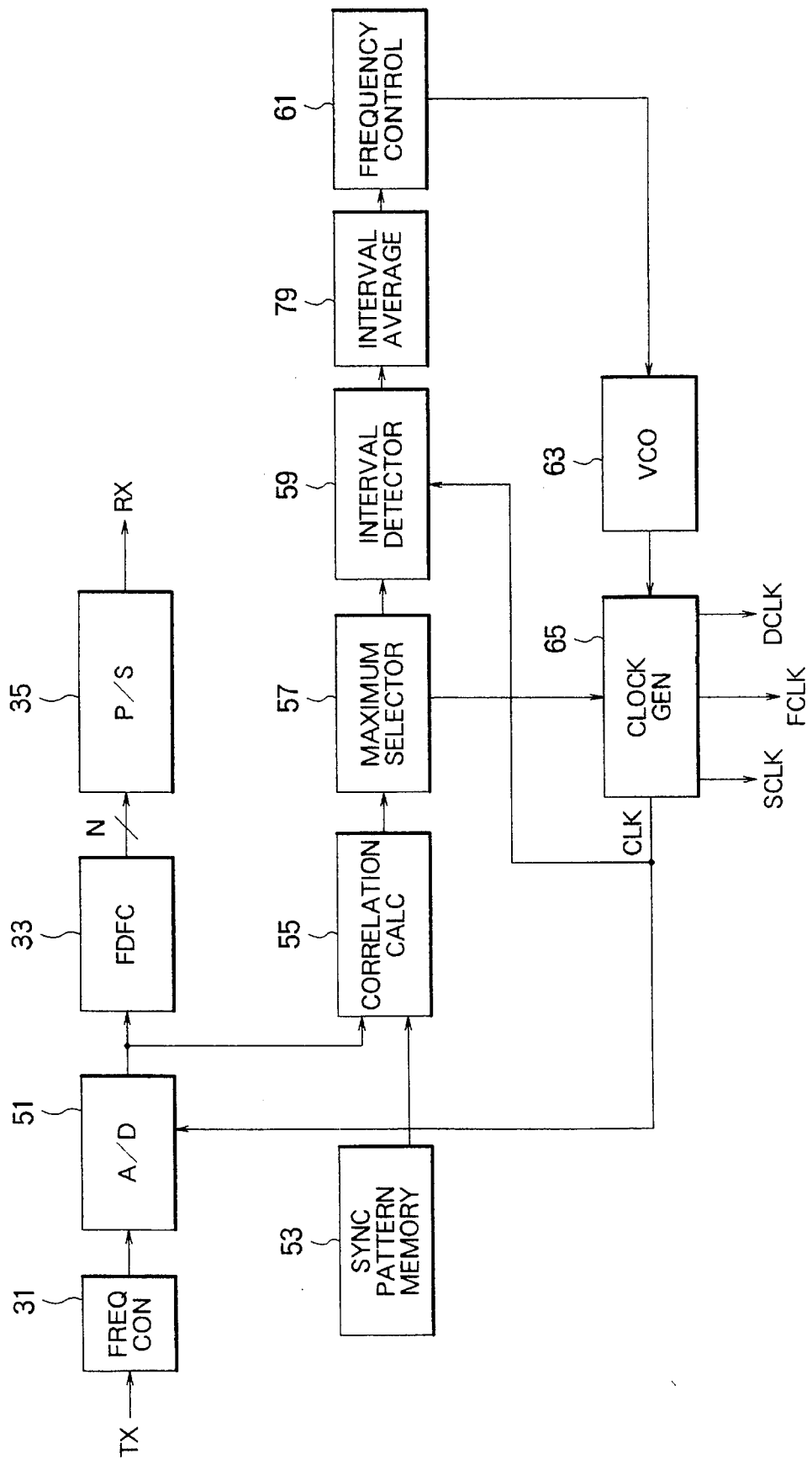
FIG. 16 is a block diagram of a receiver device in an OFDM communication system according to a fifth embodiment of this invention.

Referring to FIG. 16, the description will be directed to a receiver device for use in an OFDM digital communication system according to a fifth embodiment of this invention. Similar parts are designated by like reference numerals. Using as a counterpart device the receiver device being illustrated, a transmitter device is not different from that described with reference to FIGS. 1 through 6 and 8 and 9.

In FIG. 16, the receiver device additionally comprises an interval averaging unit 79 between the interval detector 59 and the frequency controller 61. The interval averaging unit 79 may be referred to alternatively as an interval integrator 79.

The interval detector 59 detects the time interval F' in terms of clocks of the received sampling clock signal and produces a clock count representative of the time interval each time whenever the synchronization pattern is detected. Responsive to the clock count, the interval averaging unit 79 calculates a mean interval of, or integrates, the time intervals represented by a prescribed number of the clock counts, such as from several clock counts to a few scores of clock counts. The preselected number is empirically decided in consideration of a rate of variation in either a noise level or in characteristics of a propagation path through which the transmission signal reaches the receiver device from the transmitter device. It is now appreciated that a stable control is possible on receiver clock frequencies by the mean value.

While this invention has thus far been described in specific conjunction with several preferred embodiments thereof and with a few transmitter devices and several receiver devices for use in such embodiments, it will now be readily possible for one skilled in the art to put this invention into effect in various other manners. For example, it is possible to provide a receiver device by various combinations of the receiver device described in the foregoing.

What is claimed is:

1. A method of transmitting a sequence of data as a transmission signal and of receiving said transmission signal as a reproduction of said sequence of data, said method comprising the steps of:

converting said sequence of data to data symbols by orthogonal frequency division multiplex modulation;

composing said data symbols into successive frames by adding synchronizing patterns to said frames;

transmitting said successive frames as said transmission signal;

receiving said transmission signal as a received signal;

sampling reception samples from said received signal in response to a clock sequence of a clock frequency to produce a reception sample sequence;

detecting synchronization patterns in said reception sample sequence;

generating said clock sequence in response to said synchronization patterns; and reproducing said reproduction by orthogonal frequency division multiplex demodulation of said reception sample sequence, wherein said composing step comprises the steps of:
  storing at least one synchronizing symbol to produce a stored synchronizing symbol sequence, and
  using a synchronizing symbol from said stored synchronizing symbol sequence as one of said synchronizing patterns in each frame, and wherein said detecting step comprises the steps of:
  storing a pattern comprising a synchronization pattern identical with said synchronizing symbol to produce a stored pattern sequence,
  calculating, responsive to said stored pattern sequence, a cross-correlation value between said synchronization pattern and each of candidate patterns derived from said reception sample sequence with a window of a predetermined time duration stepwise shifted relative to said reception sample sequence to produce successive cross-correlation values for said reception sample sequence,
  selecting from said candidate patterns, as reproductions of synchronizing symbols, ones of said candidate patterns that gives two successive maxima among said cross-correlation values at a time interval substantially coincident in a standstill pattern of said reception sample sequence with a frame period of said frames, said ones of candidate patterns being selected to decide said time interval successively as time intervals each of which substantially coincides with said frame period,
  averaging a prescribed number of said time intervals into a mean, interval, and
  controlling said clock frequency in response to said time interval using said mean interval as said time interval.

2. A method of transmitting a sequence of data as a transmission signal and of receiving said transmission signal as a reproduction of said sequence of data, said method comprising the steps of:

converting said sequence of data to data symbols by orthogonal frequency division multiplex modulation;

composing said data symbols into successive frames by adding synchronizing patterns to said frames;

transmitting said successive frames as said transmission signal;

receiving said transmission signal as a received signal;

sampling reception samples from said received signal in response to a clock sequence of a clock frequency to produce a reception sample sequence;

detecting synchronization patterns in said reception sample sequence;

generating said clock sequence in response to said synchronization patterns; and reproducing said reproduction by orthogonal frequency division multiplex demodulation of said reception sample sequence, wherein said composing step comprises the steps of:
  storing a main synchronizing symbol and an auxiliary synchronizing symbol, consecutively preceding said main synchronizing symbol, to produce a stored synchronizing symbol sequence, and
  using said main synchronizing symbol from said stored synchronizing symbol sequence as one of said synchronizing patterns in each frame, and wherein said detecting step comprises the steps of:
  storing a pattern comprising a synchronization pattern identical with said main synchronizing symbol to produce a stored pattern sequence,
  detecting auxiliary synchronizing patterns, while said received signal is subjected to said sampling step, to produce position estimations of where said main synchronizing symbol appears in said reception sample sequence;
  calculating, responsive to said stored pattern sequence, a cross-correlation value between said synchronization pattern and each of candidate patterns derived from said reception sample sequence with a window of a predetermined time duration stepwise shifted relative to said reception sample sequence to produce successive cross-correlation values for said reception sample sequence, said cross-correlation values being calculated with said window stepwise shifted only in said position estimations,
  selecting from said candidate patterns, as reproductions of synchronizing symbols, ones of said candidate patterns that gives two successive maxima among said cross-correlation values at a time interval substantially coincident in a standstill pattern of said reception sample sequence with a frame period of said frames, and controlling said clock frequency in response to said time interval.

3. A method of transmitting a sequence of data as a transmission signal and of receiving said transmission signal as a reproduction of said sequence of data, said method comprising the steps of:

converting said sequence of data to data symbols by orthogonal frequency division multiplex modulation;

composing said data symbols into successive frames by adding synchronizing patterns to said frames;

transmitting said successive frames as said transmission signal;

receiving said transmission signal as a received signal;

sampling reception samples from said received signal in response to a clock sequence of a clock frequency to produce a reception sample sequence;

detecting synchronization patterns in said reception sample sequence;

generating said clock sequence in response to said synchronization patterns; and reproducing said reproduction by orthogonal frequency division multiplex demodulation of said reception sample sequence, wherein said composing step comprises the steps of:
  storing at least one synchronizing symbol and a null symbol to produce a stored synchronizing symbol sequence, said null symbol consecutively preceding said synchronizing symbol and having a duration which is substantially equal to said at least one synchronizing symbol, and
  using a synchronizing symbol from said stored synchronizing symbol sequence as one of said synchronizing patterns in each frame, said clock sequence defines successive frame intervals and successive symbol intervals in each frame interval, said each frame interval being substantially identical with said frame period and being defined in response to said clock frequency, and wherein said detecting step comprises the steps of:

storing a pattern comprising a synchronization pattern identical with said synchronizing symbol to produce a stored pattern sequence, calculating, responsive to said stored pattern sequence, a cross-correlation value between said synchronization pattern and each of candidate patterns derived from said reception sample sequence with a window of a predetermined time duration stepwise shifted relative to said reception sample sequence to produce successive cross-correlation values for said reception sample sequence, selecting from said candidate patterns, as reproductions of synchronizing symbols, ones of said candidate patterns that gives two successive maxima among said cross-correlation values at a time interval substantially coincident in a standstill pattern of said reception sample sequence with a frame period of said frames, defining a null period which one of said symbol intervals comprises when said one of said symbol intervals indicates a presence of said null symbol in a sequence of said cross-correlation values in each frame interval, and controlling said clock frequency in response to said time interval, said controlling step suspending control of said clock frequency in each frame period except for said null period.

4. A receiver device for receiving a transmission signal derived from successive frames, each of which is composed of at least one synchronizing symbol and a sequence of data symbols with said data symbols produced by subjecting a sequence of data to orthogonal frequency division multiplex modulation, said receiver device comprising:

receiving means for receiving said transmission signal as a received signal;

sampling means responsive to a clock sequence of a clock frequency for sampling reception samples from said received signal to produce a reception sample sequence;

detecting means for detecting synchronization patterns in said reception sample sequence;

clock generating means responsive to said synchronization patterns for generating said clock sequence; and reproducing means for reproducing, by orthogonal frequency division multiplex demodulation of said reception sample sequence, a reproduction of said sequence of data, wherein said detecting means comprises:

storing means for storing a synchronization pattern identical with said at least one synchronizing symbol to produce a stored synchronization pattern sequence, calculating means, responsive to said stored synchronization pattern sequence, for calculating a cross-correlation value between said synchronization pattern and each of candidate patterns derived from said reception sample sequence with a window of a predetermined time duration stepwise shifted relative to said reception sample sequence to produce successive cross-correlation values for said reception sample sequence, selecting means for selecting from said candidate patterns, as reproductions of synchronizing symbols, ones of said candidate patterns that give two successive maxima among said cross-correlation values at a time interval substantially coincident in a standstill pattern of said reception sample sequence with a frame period of said frames, said ones of candidate patterns being selected to decide said time interval successively as time intervals each of which substantially coincides with said frame period, averaging means for averaging a prescribed number of said time intervals into a mean interval, and control means for controlling said clock frequency in response to said time interval using said mean interval as said time interval.

5. A receiver device for receiving a transmission signal derived from successive frames, each of which is composed of a main synchronizing symbol, an auxiliary synchronizing symbol consecutively preceding said main synchronizing symbol, and a sequence of data symbols with said data symbols produced by subjecting a sequence of data to orthogonal frequency division multiplex modulation, said receiver device comprising:

receiving means for receiving said transmission signal as a received signal;

sampling means responsive to a clock sequence of a clock frequency for sampling reception samples from said received signal to produce a reception sample sequence;

detecting means for detecting synchronization patterns in said reception sample sequence;

clock generating means responsive to said synchronization patterns for generating said clock sequence; and reproducing means for reproducing, by orthogonal frequency division multiplex demodulation of said reception sample sequence, a reproduction of said sequence of data, wherein said detecting means comprises:

storing means for storing a main synchronization pattern and an auxiliary synchronization pattern to produce a stored synchronization pattern sequence, said main synchronization pattern being coincident with said main synchronizing symbol and said auxiliary synchronizing pattern consecutively preceding said main synchronization pattern and being similar to said auxiliary synchronizing symbol, estimating means responsive to said auxiliary synchronization pattern for estimating, by detection of said auxiliary synchronizing symbol in said received signal, position estimations of where said main synchronizing symbol appears in said reception sample sequence, calculating means, responsive to said stored synchronization pattern sequence, for calculating a cross-correlation value between said main synchronization pattern and each of candidate patterns derived from said reception sample sequence with a window of a predetermined time duration stepwise shifted relative to said reception sample sequence to produce successive cross-correlation values for said reception sample sequence, said cross-correlation values being calculated with said window stepwise shifted only in said position estimations, selecting means for selecting from said candidate patterns, as reproductions of synchronizing symbols, ones of said candidate patterns that give two successive maxima among said cross-correlation values at a time interval substantially coincident in a standstill pattern of said reception sample sequence with a frame period of said frames, and control means for controlling said clock frequency in response to said time interval.

6. A receiver device for receiving a transmission signal derived from successive frames, each of which is composed of a main synchronizing symbol, an auxiliary synchronizing symbol, and a sequence of data symbols with said data symbols produced by subjecting a sequence of data to orthogonal frequency division multiplex modulation, said receiver device comprising:

receiving means for receiving said transmission signal as a received signal;

sampling means responsive to a clock sequence of a clock frequency for sampling reception samples from said received signal to produce a reception sample sequence;

detecting means for detecting synchronization patterns in said reception sample sequence;

clock generating means responsive to said synchronization patterns for generating said clock sequence; and reproducing means for reproducing, by orthogonal frequency division multiplex demodulation of said reception sample sequence, a reproduction of said sequence of data, wherein said detecting means comprises:

storing means for storing a main synchronization pattern and an auxiliary synchronization pattern to produce a stored synchronization pattern sequence, said main synchronization pattern corresponding with said main synchronizing symbol and said auxiliary synchronizing pattern corresponding with said auxiliary synchronizing symbol, estimating means responsive to said auxiliary synchronization pattern for estimating, while said sampling means produces said reception sample sequence, position estimations of where said main synchronizing symbol appears in said reception sample sequence, calculating means, responsive to said stored synchronization pattern sequence, for calculating a cross-correlation value between said main synchronization pattern and each of candidate patterns derived from said reception sample sequence with a window of a predetermined time duration stepwise shifted relative to said reception sample sequence to produce successive cross-correlation values for said reception sample sequence, said cross-correlation values being calculated with said window stepwise shifted only in said position estimations, selecting means for selecting from said candidate patterns, as reproductions of synchronizing symbols, ones of said candidate patterns that give two successive maxima among said cross-correlation values at a time interval substantially coincident in a standstill pattern of said reception sample sequence with a frame period of said frames, and control means for controlling said clock frequency in response to said time interval.

7. A receiver device for receiving a transmission signal derived from successive frames, each of which is composed of a synchronizing symbol, a null symbol consecutively preceding said synchronizing symbol, said null symbol having a duration which is substantially equal to said synchronizing symbol, and a sequence of data symbols with said data symbols produced by subjecting a sequence of data to orthogonal frequency division multiplex modulation, said receiver device comprising:

receiving means for receiving said transmission signal as a received signal;

sampling means responsive to a clock sequence of a clock frequency for sampling reception samples from said received signal to produce a reception sample sequence;

detecting means for detecting synchronization patterns in said reception sample sequence;

clock generating means responsive to said synchronization patterns for generating said clock sequence, wherein said clock sequence defines successive frame intervals and successive symbol intervals in each frame interval, said each frame interval being substantially identical with said frame period and being defined in response to said clock frequency; and reproducing means for reproducing, by orthogonal frequency division multiplex demodulation of said reception sample sequence, a reproduction of said sequence of data, wherein said detecting means comprises:

storing means for storing a synchronization pattern identical with said at least one synchronizing symbol to produce a stored synchronization pattern sequence, calculating means, responsive to said stored synchronization pattern sequence, for calculating a cross-correlation value between said synchronization pattern and each of candidate patterns derived from said reception sample sequence with a window of a predetermined time duration stepwise shifted relative to said reception sample sequence to produce successive cross-correlation values for said reception sample sequence, selecting means for selecting from said candidate patterns, as reproductions of synchronizing symbols, ones of said candidate patterns that give two successive maxima among said cross-correlation values at a time interval substantially coincident in a standstill pattern of said reception sample sequence with a frame period of said frames, null period defining means for defining a null period which one of said symbol intervals comprises when said one of said symbol intervals indicate a presence of said null symbol in a sequence of said cross-correlation values in each frame interval, and control means for controlling said clock frequency in response to said time interval, said control means suspending control of said clock frequency in each frame interval except for said null period.

\* \* \* \* \*